United States Patent [19]

Skinner, II

[11] 4,084,684

[45] Apr. 18, 1978

[54] CONVEYOR TRANSFER METHOD AND APPARATUS

[75] Inventor: Frank R. Skinner, II, St. Joseph, Mich.

[73] Assignee: Whirlpool Corporation, Benton Harbor, Mich.

[21] Appl. No.: 625,522

[22] Filed: Oct. 24, 1975

[51] Int. Cl.² .............................................. B65G 47/00
[52] U.S. Cl. .................................... 198/467; 198/470; 198/488; 214/1 BC
[58] Field of Search ................... 198/21, 25, 32, 467, 198/470, 488, 465, 473; 214/1 B, 1 BB, 1 BC, 1 BH

[56] References Cited

U.S. PATENT DOCUMENTS

| | | | |
|---|---|---|---|
| 2,628,702 | 1/1951 | Manbey | 198/27 |
| 2,771,174 | 11/1956 | Christofferson | 198/21 |
| 2,929,487 | 3/1960 | Lisowski et al. | 198/473 |
| 3,370,723 | 2/1968 | Czarnecki et al. | 214/91 |
| 3,398,842 | 8/1968 | Schichle | 198/32 X |
| 3,406,837 | 10/1968 | Kirsch et al. | 214/1 BH |
| 3,493,095 | 2/1970 | Messerly | 198/32 X |
| 3,760,956 | 9/1973 | Burch | 214/1 BC X |
| 3,770,098 | 11/1973 | Baugnies et al. | 198/25 |

FOREIGN PATENT DOCUMENTS 257,343   10/1970   U.S.S.R. ................. 198/25

OTHER PUBLICATIONS

Technical Manual Auto-Place Series 50 Parts Transfer Unit, Nov. 1973, Auto-Place Inc., Troy Mich.

*Primary Examiner*—Evon C. Blunk
*Assistant Examiner*—Douglas D. Watts
*Attorney, Agent, or Firm*—Wegner, Stellman, McCord, Wiles & Wood

[57] ABSTRACT

A method of transferring an article carried by a first moving conveyor to a second moving conveyor and apparatus for effecting the same. The transfer is effected by lifting the article from the first conveyor, transporting it to adjacent the second conveyor, and permitting the second conveyor to receive the transported article for further conveying thereof by the second conveyor. Upon sensing of the removal of the article, the transferring apparatus is returned to a start position for effecting transfer of a subsequent article from the first conveyor to the second conveyor. The transfer may be interrupted in the event the second conveyor is not in condition to receive the article being transferred, such as where the second conveyor does not have an available space for accommodating the article. Upon sensing of the receiving capability, the article may be brought from the intermediate position to the conveyor for transfer thereto. The conveyors may utilize hooks for suspending the articles being conveyed. Transporting of the article from the first conveyor to the second conveyor may be effected by an arcuate movement about a vertical pivot axis. To assure positive retention of the article by the transferring apparatus, locking structure may be incorporated therein with suitable controls. The transferring apparatus may be fluid operated for improved facilitated positive transfer of the article.

33 Claims, 11 Drawing Figures

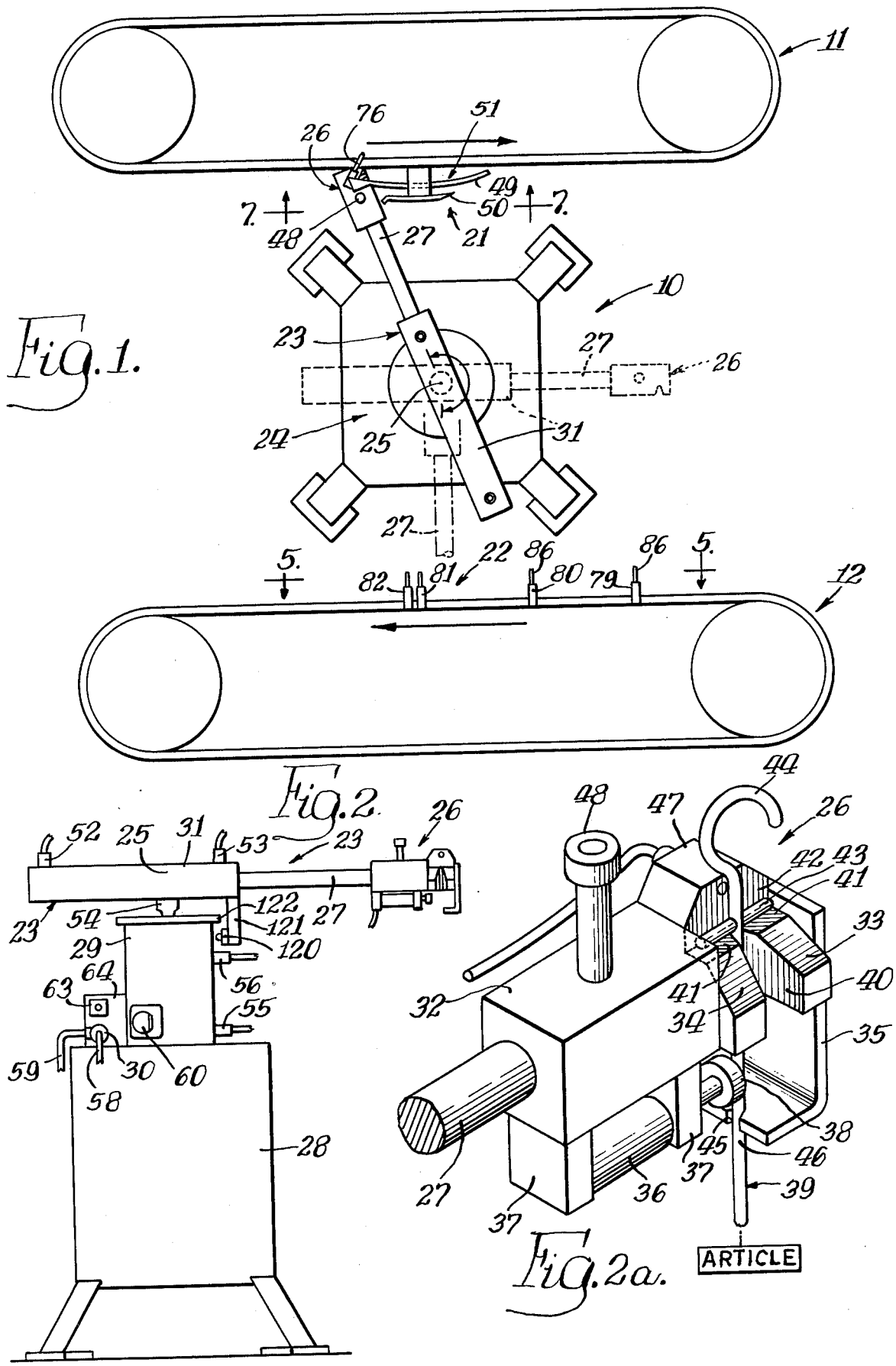

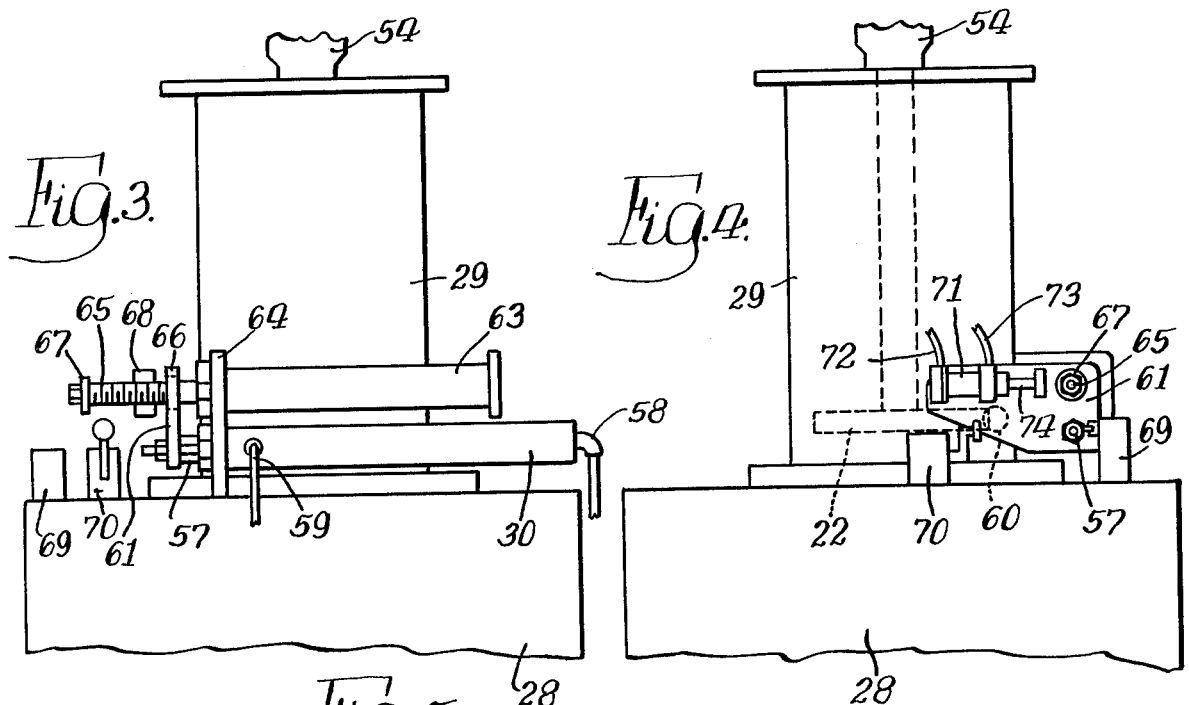
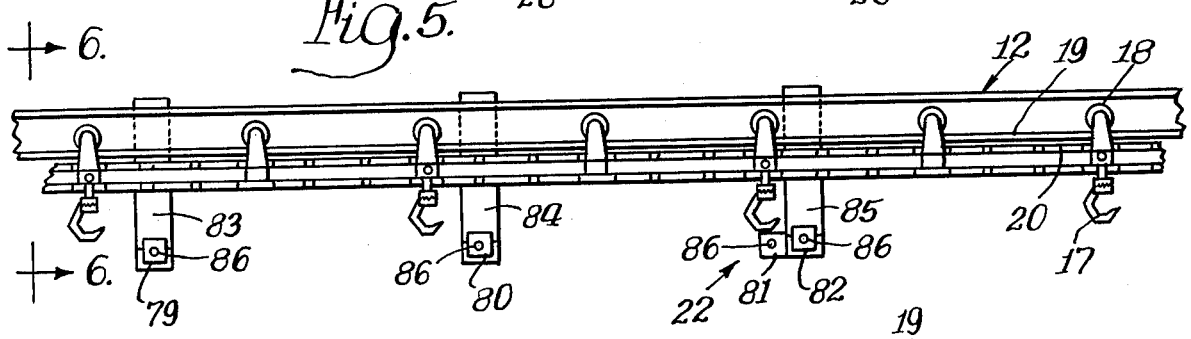
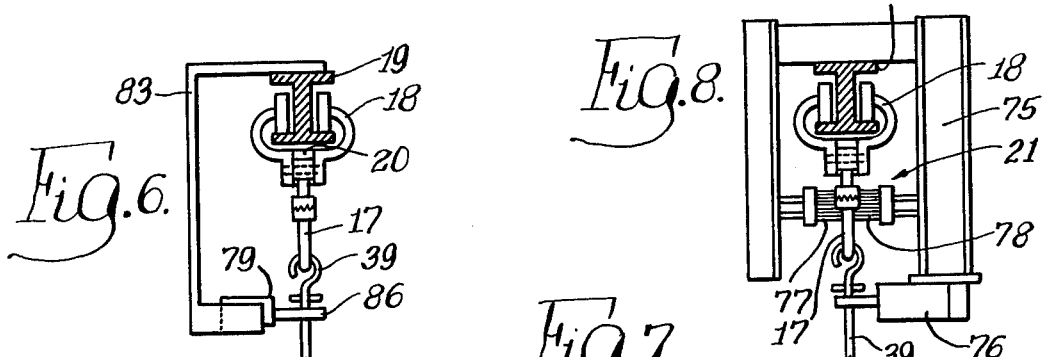
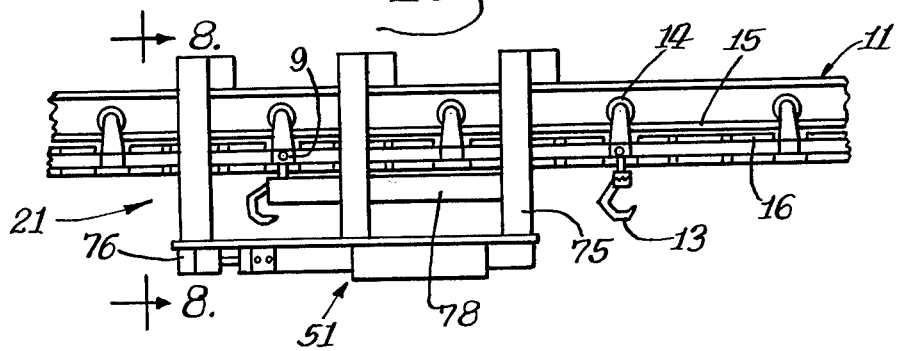

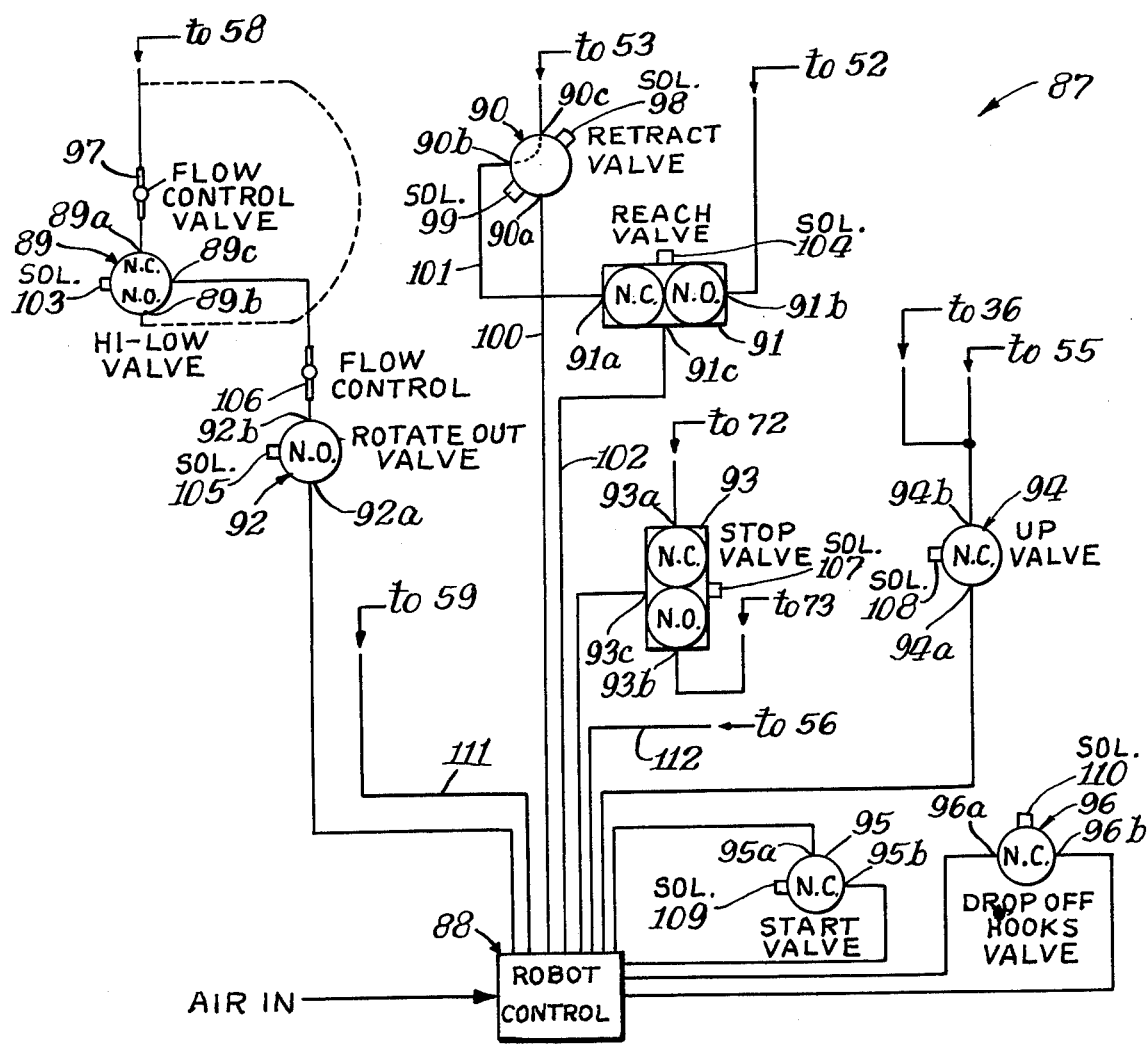

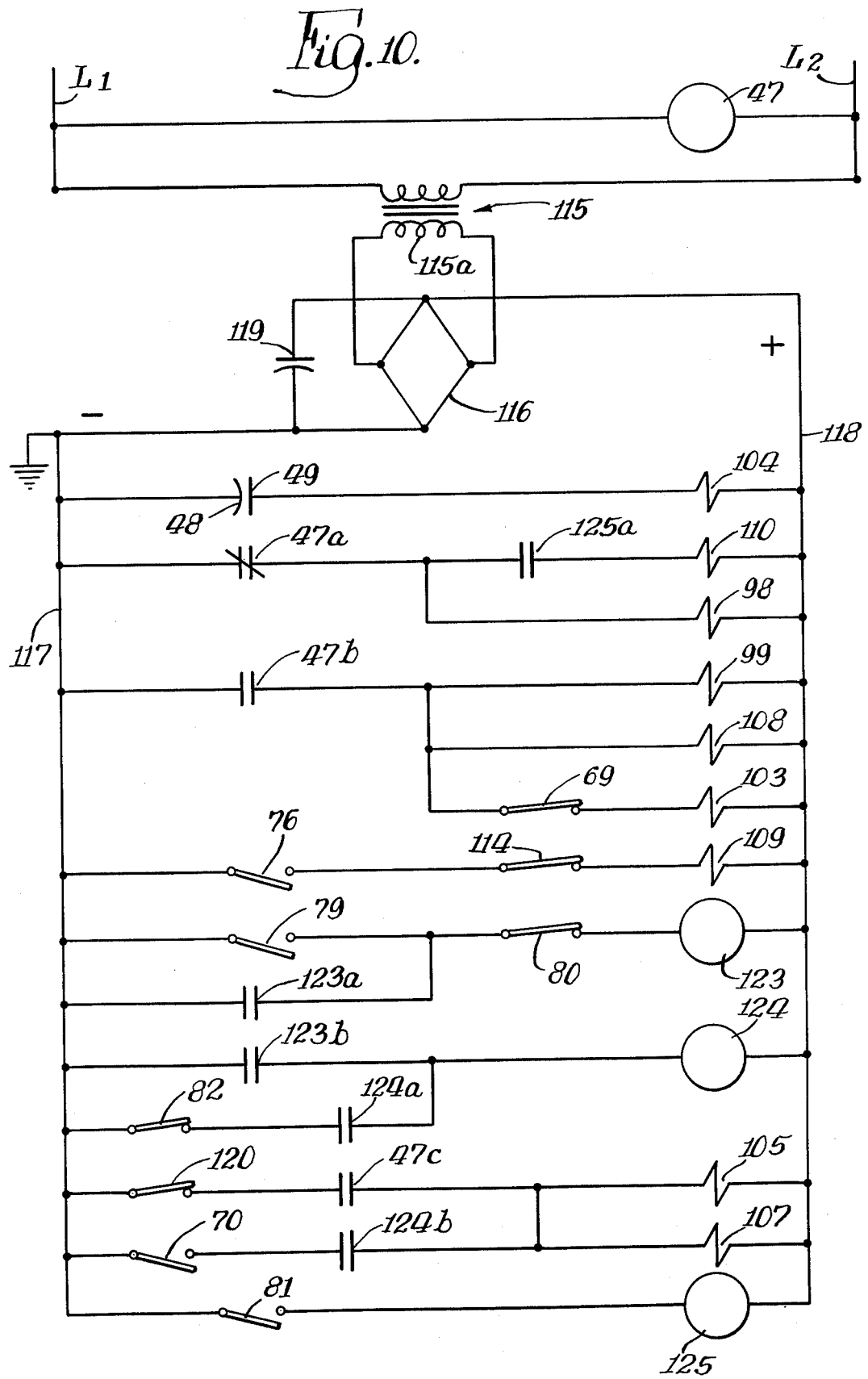

CONVEYOR TRANSFER METHOD AND APPARATUS

BACKGROUND OF THE INVENTION

1. Field of the Invention

This invention relates to material handling methods and apparatus and in particular to a method of transferring an article from a first moving conveyor to a second moving conveyor and apparatus for effecting the same.

2. Description of the Prior Art

In one conventional form of conveyor such as used in assembly lines in the manufacture of appliances, such as washers and the like, relatively bulky and heavy articles, such as washer cabinets and the like, are conveyed by conveyors along preselected assembly lines. The article may conventionally be suspended from hooks on the conveyors by means of suitable hangers associated with the articles.

In many applications, the articles must be subsequently transferred to a second conveyor for further manufacturing operations on a subsequent assembly line or for delivery of the articles such as for warehousing and the like. It has been conventional to manually remove the articles from the first conveyor and transfer the articles to the second conveyor. Such manual transferring operation is costly, and physically difficult for workers especially when the articles are relatively heavy and unwieldy. Commercially available parts transfer apparatus such as industrial robots are not capable of exercising the human judgement necessary to transfer articles to a conveyor on which it is necessary to add articles selectively.

Even industrial robots which are programable, such as those available from Auto Place, Inc. of Troy, Michigan, are not capable of operating under many conditions existing in modern industrial facilities.

Prior art apparatus such as shown in U.S. Pat. Nos. 2,628,702; 2,771,174; and 3,370,723 do not meet the needs of an application where selective transfer of articles is desirable or required.

SUMMARY OF THE INVENTION

The present invention comprehends an improved method and apparatus for automatically transferring articles carried by a first moving conveyor to a second moving conveyor, and effectively eliminates the disadvantages of the prior art transferring methods and apparatus in a novel and simple manner. The invention comprehends a transferring device situated in proximity to first and second conveyors arranged to automatically sense the presentation of an article to be transferred at a pickup position, effect a pickup of the article, transport the picked-up article to a dropoff position at the second conveyor, effect the transfer to the second conveyor, and return to a start position for effecting a subsequent similar article transfer.

The invention further comprehends the determination of the capability of the second conveyor to receive the article being transferred so as to avoid interference between the article being transferred and articles already being carried by the second conveyor. Thus, the invention comprehends interrupting the transferring operation in the event the second conveyor does not have the capability of receiving the article, and initiating the completion of the transfer operation only when such capability of the second conveyor is subsequently sensed.

The stopping of the transfer apparatus may be cushioned to minimize swing of the relatively heavy article.

The invention also comprehends locking the pickup device to the hanger to prevent inadvertent dropping of the article during the transfer operation. Unlocking of the pickup device may be effected at the dropoff position to release the article to the second conveyor. In the illustrated embodiment, the locking operation comprises a clamping of the hanger to the pickup device.

In the illustrated embodiment, the transfer apparatus is fluid operated and more specifically, is pneumatically operated, it being understood that any suitable power means may be utilized in conjunction with the transfer apparatus, as will be obvious to those skilled in the art.

BRIEF DESCRIPTION OF THE DRAWING

Other features and advantages of the invention will be apparent from the following description taken in connection with the accompanying drawing wherein:

FIG. 1 is a schematic plan view of a conveyor system and article transferring apparatus embodying the invention;

FIG. 2 is a fragmentary front elevation of the transferring apparatus;

FIG. 2a is a fragmentary perspective view of the pickup device of the transfer apparatus;

FIG. 3 is a fragmentary enlarged left side elevation of the transferring apparatus;

FIG. 4 is a fragmentary rear elevation of the transferring apparatus;

FIG. 5 is a fragmentary elevation of the conveyor system at the dropoff position;

FIG. 6 is a fragmentary vertical section taken substantially along the line 6—6 of FIG. 5;

FIG. 7 is a fragmentary elevation of the conveyor system at the pickup position;

FIG. 8 is a fragmentary vertical section taken substantially along the line 8—8 of FIG. 7;

FIG. 9 is a pneumatic flow diagram of the transfer apparatus control; and

FIG. 10 is a schematic wiring diagram of the electrical components of the control.

DESCRIPTION OF THE PREFERRED EMBODIMENT

In the exemplary embodiment of the invention as disclosed in the drawing, a transfer apparatus generally designated 10 is provided for transferring an article, such as a washer cabinet or the like, from a first moving conveyor generally designated 11 to a second moving conveyor generally designated 12.

Conveyor 11, as shown in FIG. 7, may comprise a conventional chain and hook conveyor provided with a plurality of hooks 13 carried on suitable rollers 14 rolling on support channels 15 and moved therealong by a suitable driven chain 16. As shown in FIGS. 5 and 6, conveyor 12 similarly comprises a conventional chain and hook conveyor including hooks 17 carried on rollers 18 supported on support channels 19 moved therealong by a driven chain 20.

As shown in FIG. 1, conveyors 11 and 12 may comprise spaced, side-by-side conveyors, such as conventionally employed in assembly line manufacturing operations. Transfer apparatus 10 may be mounted intermediate conveyors 11 and 12 for picking up the articles at a pickup station or position generally designated 21 and for dropping off the transferred articles at a dropoff station or position generally designated 22. In the illustrated embodiment, apparatus 10 comprises a commercially available industrial robot modified in accordance with the invention. It is available from Auto Place, Inc. of Troy, Michigan and includes a carrier generally designated 23 mounted on a support 24 for rotation about a pivot axis 25. A pickup device generally designated 26 is provided on an arm 27 of carrier 23 for engaging the article to be transferred, supporting it during the transfer operation, and dropping it off to the second conveyor in a dropoff operation.

The support 24 includes a base 28 carrying a lift cylinder 29, and a reach and retract cylinder 31. Such transferring apparatus is conventionally operated by suitable fluid operated means for effecting movement of the arm 27 and pickup device 26 about the axis 25 in effecting the desired article transfer. In the illustrated embodiment, the operation of apparatus 10 is controlled by solenoid operated, pneumatic valves as chematically illustrated in FIGS. 10 and 11, it being understood that other suitable controls may be utilized within the scope of the invention.

As shown in FIG. 2a, the pickup device, or hand, 26 includes a mounting block 32 provided with fingers 33 and 34 and a backup plate 35. A clamp cylinder 36 is mounted to the block 32 by suitable supports 37 and is provided with a clamp piston 38 which is selectively movable toward and away from backup plate 35 for cooperating with fingers 33 and 34 in locking a hanger 39 selectively in the pickup device.

More specifically, the fingers are spaced apart to define a hanger receiving space 40. At their inner ends, each of the fingers defines an upwardly facing support surface 41 extending from a vertical stop surface 42 on block 32. The hanger includes a crosspiece 43 spaced below an upper hook portion 44 which is adapted to rest on surfaces 41 in abutment with stop surface 42 in the picked-up arrangement illustrated in FIG. 2a. Bracket 35 defines a notch 45 in which a lower portion 46 of the hanger is received and clamped by the piston 38 in the picked-up arrangement to effectively lock the hanger to the pickup device during the transfer of the article from conveyor 11 to conveyor 12.

A proximity detector 47 is mounted on block 32 adjacent stop surface 42 for sensing the reception of the hanger 39 in the pickup device. The detector may comprise a conventional proximity sensing means including suitable switch contacts for use in electrically controlling certain phases of the transfer operation, as will be brought out more fully hereinafter.

As further shown in FIG. 2a, a contact 48 upstands from the block 32. Contact 48 is adapted to cooperate with a pair of plates 49 and 50 defining a cam rail generally designated 51 at the pickup position 21, as illustrated in FIG. 1. As will be brought out more fully hereinafter, the cooperation of contact 48 and cam rail 51 causes the pickup device to move parallel to the substantially rectilinear path of movement of the conveyor 11 at the pickup position 21 notwithstanding the normal arcuate on cylinder 31.

Referring now more specifically to FIGS. 2-4, cylinder 31 is provided with pressurized air supply connections 52 and 53 for variably extending and retracting respectively the arm 27 relative to the axis 25. Arm 27 comprises the piston of cylinder 31 to define a selectively extensible carrier 23 for selectively spacing the pickup device 26 relative to the pivot axis 25.

Carrier 23, and more specifically cylinder 31, is supported on the upper end of a piston 54 of the lift cylinder 29 which is selectively vertically adjusted by means of pressurized air delivered to the cylinder through a lift hose connection 55 and a drop hose connection 56.

Rotation of carrier 23 about axis 25 is effected by a piston 57 movable in rotate cylinder 30 as a result of pressurized air delivered thereto through a first hose connection 58 and a second hose connection 59. Piston 57 is mechanically linked to a rack 60 by means of a plate 61. The rack meshes with a pinion gear not shown on the piston 54 for rotating the piston and thus rotating the carrier 23 as a function of the pressurized air delivered through the hose connections 58 and 59. In the illustrated embodiment, air delivered through hose connection 58 rotates the carrier in a clockwise direction, as seen in FIG. 1, the air delivered through hose connection 59 rotates the carrier in a counterclockwise direction as seen therein.

As indicated briefly above, it is desirable to cushion the stopping of the transfer operation. To effect such cushioning, a cushioning cylinder 63 is mounted on a plate 64 carried on the base 28. Cylinder 63 is provided with a plunger 65 extending freely through an aperture 66 in plate 61 and provided at its distal end with an adjustably threaded nut 67 which is adapted to engage a stop 68 during clockwise rotation of the carrier 23.

A pair of switches 69 and 70 are provided on base 28 for controlling operation of the rotate cylinder 30 and a stop cylinder 71 (FIG. 4), respectively. Pressurized air is delivered to the stop cylinder through a "stop" hose connection 72 and a "pass" hose connection 73. Stop 68 is provided on the piston 74 of the cylinder 71. As shown in FIG. 4, cylinder 71 is mounted to plate 61 for movement therewith relative to the nut 67 on plunger 65.

Referring now to FIG. 7, the cam rail 51 is mounted on an angle iron and metal plate support 75 which also carries a switch 76. As shown in FIGS. 7 and 8, a pair of brushes 77 and 78 are mounted to the support 75 for wiping engagement with the hooks 17 at the pickup position 21 to swing the hooks reversely, as shown in FIG. 7, as the article is being lifted from the hook at the pickup position or station 21. Other means of frictionally engaging the hooks to cause them to swing reversely could also be employed.

Referring now to FIGS. 5 and 6, a plurality of sensor switches 79, 80, 81 and 82 are provided on a plurality of mounting brackets 83, 84 and 85 carried by the support channels 19 at spaced positions adjacent the dropoff position 22. Switches 79, 80, and 82 are provided for sensing the capability of conveyor 12 to receive the article to be transferred and more specifically sense the presence or absence of a hanger on the respective hooks 17. Switch 81 comprises a detection switch for detecting when a hanger has been taken from the pickup device of the transfer apparatus 10 by a hook, indicating the desired transfer to conveyor 12. As shown in FIGS. 1 and 5, switches 79, 80, 81 and 82 are provided with "cat whisker" probes 86.

In the illustrated embodiment, operation of apparatus 10 is effected by a pneumatic system generally designated 87 diagrammatically illustrated in FIG. 9. Air is delivered from a supply of pressurized air to the system through a master control generally designated 88. The system includes a plurality of solenoid valves, including a high-low valve 89, a retract valve 90, a reach valve 91, a rotate valve 92, a stop valve 93, an up valve 94, a start valve 95, and a dropoff valve 96.

High-low valve 89 comprises a three-way valve having a normally closed port 89a, a normally open port 89b, and an inlet port 89c. Port 89b is connected to hose connection 58. The valve is controlled by a solenoid 103 (FIG. 10). Port 89a communicates with hose connection 58 through a flow control valve 97 for providing a low pressure operation of the rotate cylinder through hose connection 58.

Retract valve 90 is controlled by a pair of solenoids to comprise a maintained position valve having an inlet port 90a, an exhaust port 90b, and an outlet port 90c connected to hose connection 53. The retract valve is operated by solenoids 98 and 99 (FIG. 10). Solenoid 99 closes the valve to cause the exhaust port 90b to communicate with the outlet port 90c. Energization of solenoid 98 causes opening of the valve in which the inlet port 90a communicates with the outlet port 90c. The inlet port 90a is connected to the control 88 through a line 100 and the exhaust port 90b is connected to the reach valve 91 through a line 101.

The reach valve 91, controlled by solenoid 104 (FIG. 10), is a double valve having a normally closed port 91a connected by line 101 to port 90b of the retract valve 90. The reach valve further includes a normally open port 91b and an inlet port 91c connected to the control 88 by a line 102. Port 91b is connected to connection 52 of the reach and retract cylinder 31 for causing extension of the arm 27 relative to cylinder 31.

The rotate out valve 92 is controlled by a solenoid 105 (FIG. 10) and comprises a normally open valve having an inlet port 92a connected to the control 88, and an outlet port 92b connected to a flow control valve 106. The flow control valve, in turn, is connected to the port 89c of valve 89.

Stop valve 93 is controlled by a solenoid 107 (FIG. 10) and comprises a double valve having a normally closed port 93a which is connected to connection 72 of stop cylinder 71, a normally open port 93b connected to hose connection 73 of the stop cylinder, and an inlet port 93c connected to the control 88.

Up valve 94 is controlled by a solenoid 108 (FIG. 10) and comprises a normally closed valve having an inlet port 94a connected to the control 88 and an outlet port 94b connected to hose connection 55 of lift cylinder 29 and cylinder 36 on the pickup device 26.

Start valve 95 is controlled by a solenoid 109 (FIG. 10) and comprises a normally closed valve having an inlet port 95a connected to the control 88 and an outlet port 95b connected to the control 88.

The dropoff valve 96 is controlled by a solenoid 110 (FIG. 10) and comprises a normally closed valve with an inlet port 96a connected to control 88 and an outlet port 96b connected to the control 88.

Hose connection 59 of the rotate cylinder 30 is connected to the control 88 by a line 111 and hose connection 56 is connected to the control 88 by a line 112.

Control 88 comprises programmable pneumatic control commercially available as a part of an apparatus identified as the "Auto Place Series 50" parts transfer unit available from Auto Place, Inc., Troy, Mich.

The control 88 comprises a bank of pneumatic valves which when actuated cause the pneumatically operated apparatus to perform a sequence of operations in accordance with a pre-established program. For the application of the Auto Place apparatus to the invention the control was programmed to cause the apparatus to perform, in sequence, the following operations:

start
lift and rotate (cw in FIG. 1)
drop
retract
rotate (ccw in FIG. 1)
time delay
reach
stop Additional solenoid operated valves as described above were added to modify the operation of the apparatus to achieve the desired results.

The specific mechanical detail of control 88 forms no part of the present invention except to the extent that it is programmed to provide air at specific times to appropriate air lines for accomplishing the method of the invention and only those portions of the control necessary to understand the operation of the transfer apparatus of the invention are disclosed.

In describing the operation of the transfer apparatus, it will be assumed that the control elements illustrated in FIG. 11 are with the switches in their normal position. In the start condition illustrated in FIG. 1 of the drawing, the transfer arm 27 is in the extended position on cylinder 31 with the cylinder being in a lowered position of the lift cylinder means 29. As shown in FIGS. 1, 7 and 8 the first conveyor 11 carries a switch 76 upstream of the pickup position 21. When a hook 13 of the conveyor passes the switch 113 carrying an article on a hanger 39, the hanger trips switch 76 to complete a circuit through a normally closed toggle switch 114 (FIG. 10) to the solenoid 109. As shown in FIG. 10, the electrical portion of the system is connected to power supply leads L1 and L2 and includes an input transformer 115 for dropping the power supply voltage, which conventionally may be 120 volts, to a lower control voltage, such as 24 volts. Operation of the circuit may be by direct current and, thus, a full wave rectifier 116 may be connected across the secondary 115a of the transformer to provide full wave direct current to control leads 117 and 118, respectively. A filter condenser 119 may be connected across the rectifier and lead 117 may be connected to ground. The series connection of switches 76 and 114 and solenoid 109 may be between leads 117 and 118, as shown in FIG. 11.

Energization of solenoid 109 opens start valve 95 (FIG. 9) to provide a burst of air to the control 88, which conditions the control to provide air to inlet port 94a of up valve 94 and to hose connection 58 of rotate cylinder 30 in accordance with program of the control. Valve 94, however, is closed at this time to prevent lifting of the arm 27.

Solenoids 103 and 105 are de-energized at this time so that valves 89 and 92 permit the delivery of the high pressure air from control 88 to the hose connection 58, thereby initiating rotation of the arm 27 about axis 25. Since the delivery of air to the hose connection 58 is through the high flow connection of valve 89, the arm is rotated at maximum speed so as to pursue and catch the hanger with the pickup device 26. As best shown in FIG. 1, the movement of the pickup device in a clockwise direction causes contact 48 on the pickup device to enter a channel formed by plates 49 and 50 and to contact the plate 49, which is electrically connected to the solenoid 104. As shown in FIG. 10, contact 48 is connected to control lead 117 and, thus, a circuit is completed to energize solenoid 104 of reach valve 91. Energization of the reach valve solenoid closes normally open port 91b and opens normally closed port 91a to supply air to port 90b of retract valve 90. The pressure of the air delivered to the valve 90 through port 90b overcomes the solenoid 98 which is energized through the normally closed contact 47a of proximity detector 47 and mechanically shifts the valve to the closed position in which air may pass from outlet port 90c to hose connection 53, thereby causing the retraction of arm 27.

The retraction of arm 27, however, substantially immediately causes contact 48 to become spaced from plate 49, thereby de-energizing solenoid 104 to shift reach valve 91 back to its normal position where air is supplied to hose connection 52 through the normally open port 91b of valve 91. This causes arm 27 to again move toward plate 49. Since there is a time lag in the operation of the valves, the arm could move a substantial distance back from plate 49 during the time lag, however, this is prevented by plate 50 which engages contact 48 during retraction of arm 27. The rather rapid back and forth movement of the arm 27 results in a sequence of incremental movements wherein the arm 27 is caused to reach and retract incrementally to cause the pickup device 26 to follow the channel between plates 49 and 50 as the arm 27 is rotated in a clockwise direction, as seen in FIG. 1. Since the arcuate channel is constructed with a radius of curvature which compensates for the radius of curvature of the path of movement of contact 48, the pickup device follows a substantially rectilinear path parallel to the path of movement of the conveyor 11 at pickup position 21. The back and forth incremental movement of the pickup device 26 has a beneficial effect in finding and seating the hangers in the fingers 33 and 34 of the pickup device. In some applications a smoother pickup movement might be desirable in which case the conveyor track could be constructed with an arcuate section paralleling the path of the pickup device in which case the plates 49 and 50 could be eliminated. In other applications a greater tolerance for hunting might be acceptable in which case the plate 50 might be eliminated, thus allowing the switching of the valves to provide all of the compensation for the arcuate movement of the pickup device.

As indicated above, the rotation of carrier 23 is caused to be at high speed so as to cause the pickup device to pursue and catch the hanger 39, carrying the article to be transferred, at the pickup position 21. When the pickup device catches the hanger, as shown in FIG. 2a, the proximity switch 47 is actuated so as to open contacts 47a, thus de-energizing solenoid 98. At the same time, normally open contacts 47b and 47c of proximity switch 47 are closed, thereby energizing solenoids 99, 108, 103, and 105. De-energization of solenoid 98 and energization of solenoid 99 closes retract valve 90 so that inlet port 90b is in communication with outlet port 90c to permit continuation of the reach-retract incremental action until the pickup device is swung past the right-hand end of the plate 49, as shown in FIG. 1.

Energization of solenoid 105 causes air to be removed from the rotate cylinder momentarily for a purpose hereinafter explained.

The concurrent energization of solenoid 108 causes the up valve 94 to open, thus supplying air to clamp cylinder 36 and hose connection 55, thereby clamping the hanger in the pickup device and concurrently lifting the hanger from the hook 13.

As shown in FIGS. 7 and 8, the lifting of hanger 39 from the hook 13 permits brushes 77 and 78 to pivot the hook in a clockwise direction about a pivot point 9, as shown in FIG. 7, as a result of the frictional engagement of the brushes with the hook as the hook is carried past the pickup position by chain 16.

The pivoting of the hooks 13 is desirable because it provides a more positive and quicker release of the hangers 39 from the hooks. Also as the pickup device nears the end of the pickup station it is desirable to begin to slow its speed as hereinafter described. If for any reason the pickup device has not successfully picked up a loaded hanger until nearing the end of the pickup station, the combination of the speed of conveyor and the reducing speed of the pickup device could cause a hanger to hang up on a hook. The brushes 77 and 78 effectively prevent such a hang up by causing the hook to be pivoted upwardly out of engagement position with the hanger 39.

When transfer of the support of the article is effected to the pickup device 26 and support arm 27, the high speed rotation of the arm may be discontinued so as to reduce initial forces on the article being transferred. This is automatically effected by the energization of solenoid 103 at this time to open port 89a of high-low valve 89 and close port 89b thereof permitting the air supply to hose connection 58 to now be effected through the flow control valve 97 which effectively reduces the air pressure and concurrently reduces the rotational speed of carrier 23.

Referring now to FIGS. 2 and 10, a switch 120 is carried on a bracket 121 attached to the reach and retract cylinder 31 to have selective engagement with a stop 122 carried on the top of lift cylinder 29 when the carrier 23 is raised to an upper position. Switch 120 comprises a normally closed switch connected in series with a second set of normally open contacts 47c of proximity switch 47 to complete a circuit to solenoids 105 and 107 under the condition that the proximity switch has sensed the presence of the hanger 39 in the pickup device 26 but has not raised the pickup device and hanger as yet to the lifted position. This functioning permits the lifting of the article to be effected without concurrent forceful rotation of the carrier as the energization of solenoid 105 closes valve 92 to interrupt air flow to the valve 89 and, thus, to the rotate cylinder hose connection 58. Upon opening of switch 120 at the upper limit of movement of the lift cylinder piston 54, solenoids 105 and 107 are de-energized, permitting valve 92 to open and thereby restore normal operation of the high-low valve 89 wherein the rotate cylinder is operated to rotate the arm in a clockwise direction, as seen in FIG. 1, to bring the article toward second conveyor 12.

In assembly line operations, it is possible for the second conveyor, at times, to be not in a condition for receiving the article to be transferred from the first conveyor. Illustratively, at the time the article being transferred is being swung on the carrier 23 toward conveyor 12, the next hook, or hooks, on conveyor 12 may be already carrying a suspended article so that they are not available for receiving the article being transferred. It is, therefore, necessary to interrupt the transfer operation until such time as an available hook is brought to the dropoff position 22 to accept the article being transferred. The determination of the capability of the second conveyor to receive the article is effected by switches 79, 80 and 82. Switch 79 comprises a normally open switch which, when closed, completes a circuit to a holding relay coil 123. The holding relay further includes normally open contacts 123a and 123b which are closed by the energization of relay 123.

As shown in FIG. 10, switch 80 is connected in series with coil 123 and, thus, when the hook carrying the hanger 39 closes switch 79, the circuit is maintained to coil 123 until the hanger engages the probe 86 of switch 80. The second set of holding contacts 123b are connected in series with the coil 124 of a second relay which is provided with a first set of normally open holding contacts 124a and a second set of normally open holding contacts 124b. Energization of coil 124 closes contacts 124a to hold in the relay through a series circuit of contacts 124a and a normally closed switch 82. Closing of contacts 124b completes a circuit to solenoid 107 through normally open switch 70 (FIG. 3). Switch 70 is closed as a result of the movement of piston 57 which moves plate 61 to the left, as seen in FIG. 3, to operate switch 70 at approximately the time pickup device 26 moves past the right-hand end of plate 49, as seen in FIG. 1.

Energization of solenoid 107 operates stop valve 93 to open the normally closed port 93a to supply air to hose connection 72 of the stop cylinder 71, thus moving piston 74 to the right, as shown in FIG. 4, to bring stop 68 on piston 74 into interfering relationship with nut 67 on plunger 65 of cushioning cylinder 63.

Referring now to FIG. 3, as the plate 61 carried by the piston 57 of rotate cylinder 30 is moved to the left, plate 61 comes into contact with stop 68 on piston 74 prior to the time that plate 61 normally would have contacted nut 67 had the piston 74 been in a retracted position. Thus, when the stop cylinder 71 is actuated, carrier 23 is stopped in a position intermediate the two conveyors, as shown in broken lines in FIG. 1. The stopping is cushioned by the action of cushioning cylinder 63 so as to prevent undesirable swinging of the suspended article notwithstanding the abrupt termination of the swinging movement at the intermediate position.

When the hanger 39 causes opening of normally closed switch 80 as the hanger is moved to the left, as seen in FIG. 1, the holding circuit to relay 123 is broken, thus opening the holding contacts 123a and 123b. At this time, however, relay 124 remains energized through the holding contacts 124a and the normally closed switch 82 on the conveyor 12. Carrier 23 remains positioned in the intermediate position by the abutment of stop 68 against nut 67.

In the event that the following hook on conveyor 12 does not carry a hanger, switch 79 is not reactuated as the hanger moves from switch 80 to switch 82 in the normal movement of conveyor 12. The hanger opens switch 82 to de-energize relay 124 which, in turn, opens its holding contacts 124a and 124b to further de-energize solenoid 107.

De-energization of solenoid 107 allows stop valve 93 to return to its normal condition wherein air is provided to "pass" hose connection 73 causing the piston 74 of the stop cylinder 71 to be retracted and thereby freeing the rotate cylinder piston 57 for further movement until plate 61 contacts the nut 67 to provide a final limitation on the rotational movement of the carrier to drop off position 22 as shown in dot-dash lines in FIG. 1.

It should be noted that if the second hook also contained a hanger, switch 79 would have been reclosed prior to the opening of switch 82, thus re-energizing the holding relay 123 and permitting its holding contacts 123a and 123b to be maintained closed, relay coil 123 being energized through the maintained closed switch 80. In this event, when switch 82 is opened by the first hanger, relay 124 would remain energized through contact 123b of the first holding relay 123 notwithstanding the opening of switch 82, thereby maintaining contacts 124a closed to hold in relay 124 and maintaining contacts 124b closed to maintain energization of solenoid 107, thereby maintaining the stoppage of the carrier at the intermediate position.

As the sensing operations of the switches 79, 80 and 82 must be effected sequentially as discussed above, the spacing therebetween must be less than the minimum spacing between all pairs of hooks on the conveyor to assure the prevention of completion of the transfer operation to a non-empty hook. The location of the spaced switches relative to the dropoff position 22, however, is a function of the speed of the conveyor 12 and the rotational speed of carrier 23 which must be correlated to assure that the carrier will bring the suspended article to the dropoff position 22 suitably to have the suspended article picked up by the next empty hook 17, as determined by the switches as discussed above. Normally closed switch 69, in series with solenoid 103, is opened by the piston 57 slightly before the carrier reaches the dropoff position to again cushion the stopping of the carrier for effectively avoiding inertia problems in the stopping operation. Thus, in the normal operation of the transfer apparatus, the transfer may or may not be stopped at the intermediate position depending on the condition of the hooks on the second conveyor to receive the article being transferred. In the event that all hooks being brought to the dropoff position are empty, all transfer operations would be uninterrupted with the carrier being swung in a continuous movement from the pickup position to the dropoff position. The carrier, however, may be temporarily retained at the start position awaiting the movement of an article to be transferred by the first carrier to the pickup position, as discussed above.

When the carrier is swung to the dropoff position, it positions the suspended article suitably to permit the upcoming hook to engage portion 44 of the hanger 39 to remove the hanger and article from the pickup device 26. Such removal is sensed by the proximity switch 47 and thusly results in the opening of contacts 47b and 47c and closing of contacts 47a. Resultingly, solenoids 99, 108 and 103 are de-energized and solenoid 98 is energized. De-energization of solenoid 108 closes the up valve 94 causing back pressure to control 88 which causes the control to step to its drop operation at the completion of which it steps to its retract operation to supply air through the now open valve 90 which was opened as a result of the de-energization of solenoid 99 and energization of solenoid 98. De-energization of solenoid 103 permits the high-low valve to return to the normal position wherein the flow therefrom is from the high pressure outlet port 89b.

The downward movement of the carrier causes actuation of switch 81 which is connected in series with a relay coil 125 having a normally open contact 125a connected in series with solenoid 110. The energization of coil 125 effects a closing of the contacts 125a which completes a circuit to the solenoid 110 of dropoff valve 96 to open the normally closed valve allowing a pulse of air to step the control 88 for shifting air to the rotate in hose connection 59 of the rotate cylinder 30 for returning the carrier to the start position. In the start position, control 88 steps to a short time delay and then on to reach and stop steps.

Return of the carrier 23 to the start position is effected by the control 88 for transferring subsequent articles from conveyor 11 to conveyor 12 in a similar manner as discussed above.

Having described the invention, the embodiments of the invention in which an exclusive property or privilege is claimed are defined as follows:

1. A method of transferring an article carried by a first conveyor to a second conveyor, comprising the steps of:
   sensing the presence of an article to be transferred at a pickup position;
   pursuing the sensed article with a transfer element; sensing when said article is in a position to be picked up by said transfer element;
   picking up the article from the first conveyor with the transfer element; and,
   moving the transfer element to bring the picked up article to a dropoff position whereat the article is transferred from the transfer element to the second conveyor.

2. The method of claim 1 including the additional step of returning the transfer element to a starting position for a further transfer operation.

3. The method of transferring an article of claim 1 including the additional step of stopping movement of the transfer element toward the dropoff position in an intermediate hold position.

4. The method of transferring an article of claim 3 including the additional step of sensing the capability of the second conveyor to accept the article being transferred and then completing the movement of the transfer element to the dropoff position.

5. The method of transferring an article of claim 1 wherein said transfer element is swung about a rotational axis in moving between said pickup and dropoff positions.

6. The method of transferring an article of claim 1 wherein said articles are suspended from said first conveyor.

7. The method of transferring an article of claim 1 wherein said articles are suspended from said first conveyor and said articles are lifted during the pickup thereof from said first conveyor.

8. A method of transferring an article from a first conveyor to a second conveyor, comprising the steps of: picking up the article from the first conveyor with a pickup device at a pickup position; swinging the pickup device about an axis toward a dropoff portion at the second conveyor;
   determining the capability of the second conveyor to accept the picked up article; and selectively (a) stopping the swinging of the pickup device and article at a hold position until the second conveyor is determined to be capable of accepting the article and then swinging the pickup device and article to deliver the article to the second conveyor at said dropoff position; or (b) causing the swinging of the pickup device and article continuously from said pickup position to said dropoff position to deliver the article to the second conveyor without stoppage at the hold position in the event the second conveyor is determined to be capable of accepting the article.

9. The method of transferring an article of claim 8 including sensing when the article has been received by the second conveyor; and returning the pickup device to a starting position adjacent the first conveyor.

10. The method of transferring an article of claim 8 wherein the selective stopping of the swinging at said hold position is cushioned.

11. The method of transferring an article of claim 8 wherein said pickup, hold and dropoff positions are angularly spaced about a vertical axis of swinging of the pickup device.

12. The method of transferring an article of claim 8 wherein said hold position is substantially halfway between the pickup and dropoff positions at the first and second conveyors, respectively.

13. A method of transferring an article suspended on a hanger from a first conveyor to a second conveyor, comprising the steps of: positioning a pickup device at a start position adjacent said first conveyor; catching the article carried by the first conveyor with a pickup device by accelerating the pickup device from said start position toward the article to engage the hanger at a pickup position; locking the hanger to the pickup device to retain the picked up article is association therewith; lifting the locked hanger and supported article with the pickup device; decelerating the pickup device and article to a reduced transfer speed and moving the pickup device and article away from said first conveyor toward a dropoff position; selectively causing the movement of the article to be stopped at a position intermediate said first conveyor and said dropoff position in response to a signal corresponding to a preselected operating condition of the second conveyor; and causing movement of the pickup device and article to the dropoff position substantially immediately upon discontinuation of said signal whereby the article may be transferred to the second conveyor; and causing the pickup device and article to be caught by the second conveyor whereby the article is effectively transferred to the second conveyor.

14. The method of transferring an article of claim 13 including the step of temporarily stopping the moving pickup device in a position intermediate the first and second conveyors while maintaining the hanger locked in the event the second conveyor is temporarily incapable of receiving the article being transferred.

15. The method of transferring an article of claim 13 wherein said first conveyor includes a hook for removably engaging said hanger to suspend said article from said conveyor, said pickup device engaging said hanger and lifting it from said hook upon locking of the hanger to the pickup device.

16. The method of transferring an article of claim 13 wherein the locking step comprises a clamping step.

17. The method of transferring an article of claim 14 wherein said article is swingably carried by said hanger, said first conveyor having a hook for removably engaging said hanger to suspend said article from said hook, said pickup device engaging said hanger and lifting it from said hook upon locking of the hanger to the pickup device, the stopping of the article at said intermediate position being cushioned to effectively minimize swinging of the article on the hanger.

18. Apparatus for transferring an article carried by a first conveyor to a second conveyor, comprising: first sensing means for sensing the presence of an article movingly carried by the first conveyor adjacent a pickup position; a transfer element; means for disposing said transfer element at a starting position adjacent said first conveyor; means responsive to said first sensing means sensing the article for causing the transfer element to accelerate from the start position to catch the sensed article; second sensing means for sensing when said transfer element catches the article at the pickup position; means responsive to said second sensing means for causing the transfer element to pick up the article from the first conveyor; and means for decelerating the transfer element and picked up article and bringing the picked up article to a dropoff position adjacent the second conveyor whereat the article may be transferred from the transfer element to the second conveyor.

19. The apparatus of claim 18 including the means for returning the transfer element to the starting position to ready the transfer element for a further similar transfer operation immediately subsequent to the article having been transferred from said pickup element to the second conveyor.

20. The apparatus of claim 18 wherein said transfer element comprises a lifting device and means for selectively engaging said lifting device with the article.

21. The apparatus of claim 18 wherein said article is provided with a removable carrier and said transfer element comprises a lifting device and means for selectively engaging said pickup device with the article carrier to lift the same from carried association with said first conveyor.

22. The apparatus of claim 21 wherein said transfer element comprises a clamping device, and means for clamping said device to said carrier.

23. The apparatus of claim 21 wherein said second sensing means comprises a proximity switch responsive to the juxtaposition of the carrier to the transfer element.

24. The apparatus of claim 18 further including means for concurrently clamping the transfer element to the article at the time of pickup of the caught article.

25. The apparatus of claim 18 wherein said transfer element comprises an arm having at one end a pickup device, and means for supporting said arm horizontally for swinging movement about a vertical axis to move said pickup device in a substantially circular path between the first and second conveyors.

26. The apparatus of claim 18 further including means for stopping movement of the transfer element and picked up article toward the dropoff position in an intermediate hold position.

27. The apparatus of claim 18 further including means for stopping movement of the transfer element and pickup up article toward the dropoff position in an intermediate hold position, and means for sensing the capability of the second conveyor to accept the article being transferred before completing the movement of the transfer element and picked up article to the dropoff position.

28. The apparatus of claim 27 said movement stopping means includes means for cushioning the stopping.

29. Apparatus for transferring an article from a first conveyor for subsequent delivery to a second conveyor, comprising: means for sensing the presence of an article carried by the first conveyor at a position upstream of a pickup position; a rotatable carrier provided with a pickup device; means for rotating the carrier as an incident of said sensing means sensing the article to cause the pickup device to catch the article at said pickup position while moving substantially in the direction of movement of the article; means for causing the pickup device to pick up the article from the first conveyor at said pickup position; and means for rotating the carrier to bring the picked up article away from the first conveyor to a hold position whereat the article movement is stopped to permit the article to be subsequently transferred to the second conveyor only when the second conveyor is capable of accepting the article, said hold position being spaced from said first conveyor sufficiently to permit movement of subsequent articles on said first conveyor through said pickup position while said picked up article is temporarily held at said hold position.

30. The apparatus for transferring an article of claim 29 wherein said carrier comprises an elongated arm, said rotating means vertically adjustably supports the arm at one end thereof, and said pickup device is carried on the opposite end of the arm to swing in an arcuate path away from said pickup position.

31. The apparatus for transferring an article of claim 29 wherein means are provided for moving said pickup device on said rotating carrier to cause the pickup device to have substantially rectilinear movement at said pickup position and arcuate movement away from said pickup position.

32. The apparatus for transferring an article of claim 29 wherein means are provided for cushioning the stopping carrier rotation at said hold position.

33. The apparatus for transferring an article of claim 29 wherein said moving means comprises fluid operated power means.

* * * * *